P. G. VAN WIE & A. E. PAYNE.
Locomotive Head-Lights.

No. 149,897.

Patented April 21, 1874.

Witnesses

Inventors
Peter G. Van Wie
Albert E. Payne
Per Geo. W. Tibbitts, Atty.

UNITED STATES PATENT OFFICE.

PETER G. VAN WIE AND ALBERT E. PAYNE, OF CLEVELAND, OHIO.

IMPROVEMENT IN LOCOMOTIVE HEAD-LIGHTS.

Specification forming part of Letters Patent No. 149,897, dated April 21, 1874; application filed March 2, 1874.

*To all whom it may concern:*

Be it known that we, PETER G. VAN WIE and ALBERT E. PAYNE, of Cleveland, in the county of Cuyahoga and State of Ohio, have invented an Improvement in Head-Lights for Locomotives, of which the following is a specification:

The invention consists in making peculiar-shaped grooves in the reflector, whereby light is directed from the lamp to the said colored lenses, and in such a form and manner that the reflection of the main or white light is not interrupted or obstructed.

To enable others to fully understand our invention we will proceed to describe the same in detail, by the aid of the accompanying drawing.

Figure 1:
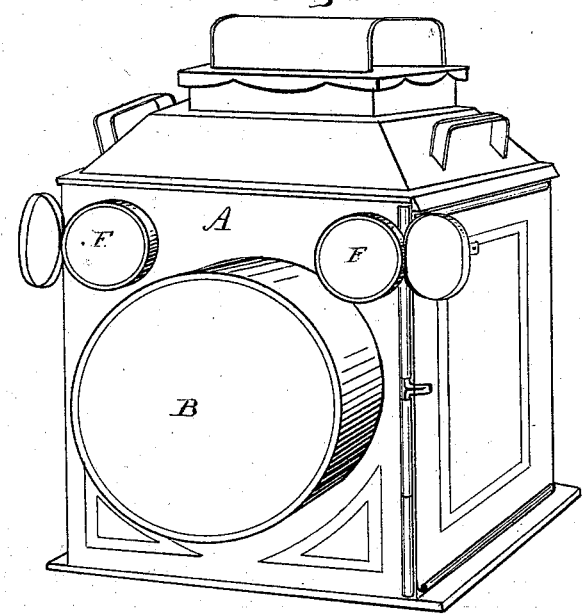
Figure 2:
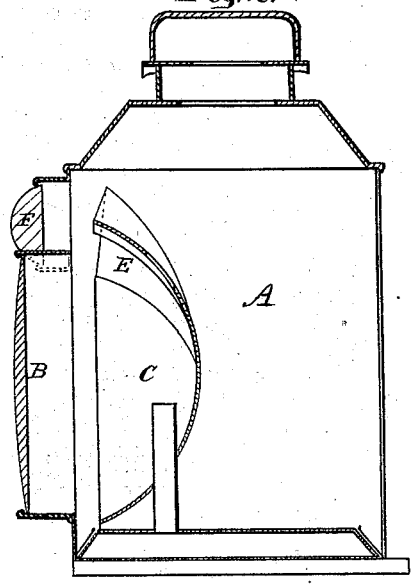
Figure 3:
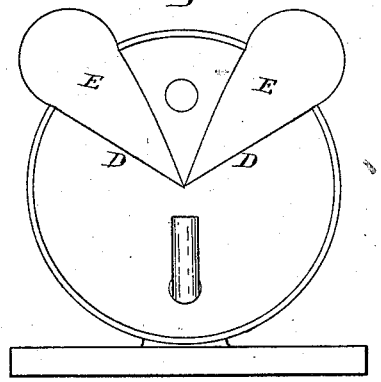

Figure 1 is a perspective view of a locomotive head-light containing our improvements. Fig. 2 is a vertical section of same. Fig. 3 is a detached front view of the reflector, showing the aforementioned grooves.

A represents the case of a locomotive head-light of the usual form and construction, in the front of which we place a plano-convex glass, B, instead of a plane glass, for the purpose of giving more concentrated rays from the lantern, and cast them directly forward along the railroad-track. C is a reflector of the usual form, but for a purpose hereinafter shown we cut two slots, D D, radiating from the center, as shown, and place in said slots grooved and curved channel-reflectors E E, so formed that by their cross-reflecting surfaces the radiation forward by the reflector C is continued as formerly. The said grooved reflectors reach beyond the periphery of the main reflector C, and radiate toward the two upper front corners of the lantern A. In the front of the lantern A, at the two upper corners, we place two red bull's-eye lenses, F F, directly in front of the upper ends of the curved and grooved reflectors. Through the said grooves a stream of light from the lamp is conveyed to the lenses F F, and by them a red light is thrown out. The object of the red lenses is for signaling following trains, and to be employed instead of the colored lanterns now hung on the front of a locomotive. A door or cover for the red lenses is attached, which can readily be closed for shutting off their light.

By using bull's-eye lenses the light can be seen from the side of the locomotive as well as the front.

Having described our invention, we claim—

The combination, in locomotive head-lights, of the bull's-eye lenses F F and the grooved reflectors E E, made in the main reflector C, for directing light to lenses F F, substantially as shown, and for the purpose set forth.

PETER G. VAN WIE.
ALBERT E. PAYNE.

Witnesses:
GEO. H. TIBBITTS,
GEO. A. KOLBE.